United States Patent
Patterson

[15] 3,678,776
[45] July 25, 1972

[54] SEALING AND WIPING MEANS FOR BALL SCREW ACTUATOR

[72] Inventor: Donald S. Patterson, Corona, Calif.

[73] Assignee: Sargent Industries, Inc., Los Angeles, Calif.

[22] Filed: Sept. 21, 1970

[21] Appl. No.: 74,032

[52] U.S. Cl..................................................74/459, 74/467
[51] Int. Cl.......................................F16h 55/22, F16h 57/04
[58] Field of Search...............................................74/459, 467

[56] References Cited

UNITED STATES PATENTS

| | | | |
|---|---|---|---|
| 2,757,548 | 8/1956 | Smith et al. | 74/459 X |
| 2,076,180 | 4/1937 | Griswold | 74/459 X |
| 3,116,931 | 1/1964 | Edwards | 74/459 X |
| 3,532,004 | 10/1970 | Nilsson | 74/459 |

*Primary Examiner*—Leonard H. Gerin
*Attorney*—Smyth, Roston & Pavitt

[57] ABSTRACT

A resiliently deformable elastomeric ring seats in a non-rotary manner in a continuous inner circumferential channel of a nut of a ball screw actuator to cooperate with the screw of the actuator as a wiper and sealing means. The channel is wider than the ring to permit slight axial shift of the ring and the ring has at least one continuous narrow outer circumferential sealing rib in contact with the bottom of the channel that yields sufficiently under radial compression to compensate for the range of clearances afforded by the given tolerances of the nut and screw to insure that the body of the ring will not be radially compressed to a destructive degree.

23 Claims, 11 Drawing Figures

Patented July 25, 1972 3,678,776
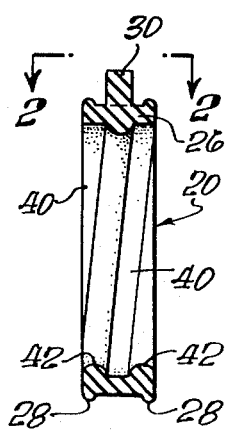
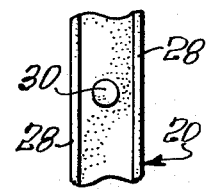
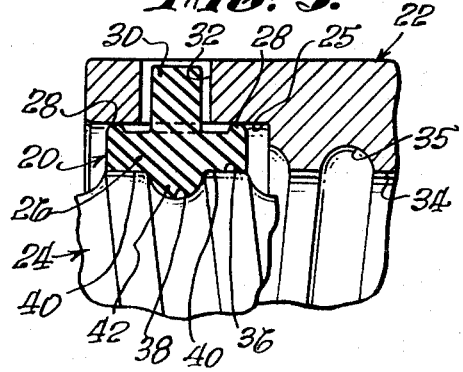
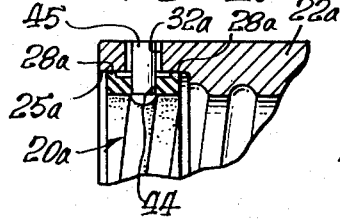
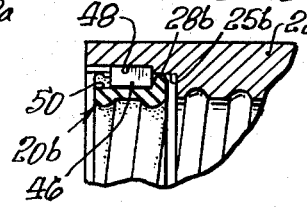
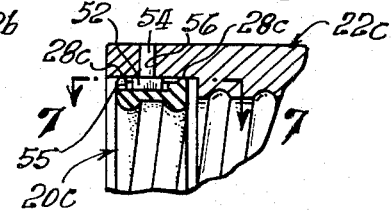
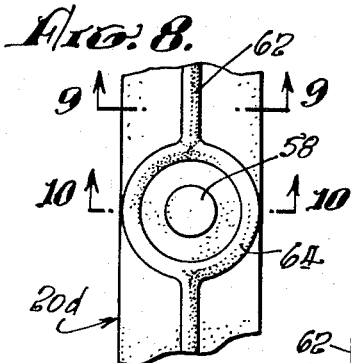
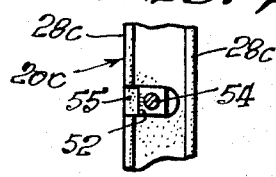
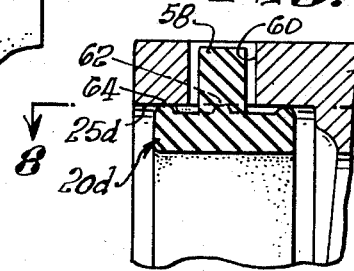
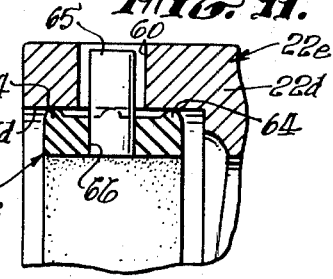
INVENTOR
DONALD S. PATTERSON,
By Smyth, Roston & Pavitt
ATTORNEYS

SEALING AND WIPING MEANS FOR BALL SCREW ACTUATOR

BACKGROUND OF THE INVENTION

In the normal functioning of a ball screw actuator suitable lubricant is employed to minimize frictional resistance to relative rotation between the nut and the screw of the actuator. When the screw extends axially relative to the nut, the relatively thick lubricant coating thereon is exposed to pick up foreign particles which are carried back into the interior of the nut when the screw is subsequently retracted. Repeated cycling of the screw not only progressively reduces the amount of lubricant that is effective between the nut and the screw but also progressively contaminates the lubricant. As a consequence excessive wear can be avoided only by cleaning the parts and replacing the lubricant at relatively short intervals.

One prior art answer to this problem is to provide the nut with an inner circumferential ring that serves as a wiper to remove the foreign particles on the screw as the screw retracts into the interior of the nut. Such a wiper ring does reduce to a useful degree the entrance of foreign particles into the interior of the nut but, nevertheless, does not embrace the nut with sufficient tightness to serve as a highly efficient barrier against intrusion of the foreign particles. The relative looseness of the ring, moreover, permits escape of lubricant from the interior of the nut and therefore does not prevent the effective portion of the lubricant from being progressively diminished at an undesirable rate. Thus although such a wiper ring does reduce wear and does prolong the intervals during which the ball screw actuator may operate without being serviced, there is a need for a tighter fitting wiper ring that will not only block the entrance of foreign particles but will also serve as a seal against the loss of lubricant.

The underlying reason for the relatively loose fit of the prior art wiper rings is found in the range of clearances between the nut and the cooperating screw that is afforded by the dimensional tolerances of the nut and the screw. On the one hand, the wiper ring must be of sufficient radial dimension to serve its purpose at the maximum clearance in this range and, on the other hand, it must be sufficiently capable of radial contraction to function at the minimum clearance in the range. Too often a wiper ring that is effective at the maximum clearance in the range is so tightly compressed at the other end of the range that it binds or freezes with consequent destruction of the ring.

One way that such a structural failure has been prevented has been to design the wiper ring with optimum dimensions for a relatively small clearance in the range of clearances with the consequence that the ring is not efficient when the clearance is relatively large. Another way that the difficulty has been avoided has been to make the ring largely if not entirely of a highly yieldable fibrous material such as felt which may be readily compressed without excessive resistance. Such fibrous material, however, does not provide an effective seal for containment of the lubricant.

The object of the present invention is to provide a wiping and sealing ring that will function over the whole range of clearances for given tolerances in the dimensioning of the nut and screw of a ball screw actuator.

SUMMARY OF THE INVENTION

The nut of the ball screw actuator is formed with an inner circumferential channel having a cylindrical bottom wall and a resiliently deformable elastomeric ring is seated in the channel with suitable means interlocking the elastomeric ring and the nut to keep the ring from rotating relative to the nut. The interlocking may be accomplished, for example, by forming the elastomeric ring with a radial projection to seat in a recess or bore in the nut or may be accomplished by providing a key or pin to engage recesses in the elastomeric ring and the nut respectively.

The elastomeric ring is of appreciable lesser width than the channel in which the elastomeric ring seats so that the elastomeric ring is free to shift axially sufficiently to compensate for variations in backlash between the nut and the screw and, of course, the interlocking means is designed to permit this freedom.

The elastomeric ring has a body that provides the width dimension of the ring and the ring is further formed with at least one continuous outer circumferential sealing rib or lip of substantially less width than the body, the rib or lip maintaining sealing contact with the cylindrical bottom surface of the inner circumferential channel in which the elastomeric ring is seated. The radial dimension of the elastomeric ring including its outer circumferential sealing rib relative to the radial dimension of the channel is of a magnitude for the ring to form an effective seal between the nut and screw without binding compression of the body of the ring at the minimum clearance within the range of clearances that is provided by the given tolerance in the dimensioning of the nut and the given tolerance in the dimensioning of the screw.

At the minimum clearance in the range of clearances the relatively narrow sealing rib is greatly compressed but the body of the elastomeric ring as distinguished from the sealing rib is not compressed to such degree as to cause the elastomeric ring to "freeze" or to be unduly heated by friction. Thus compensation for the whole range of clearances between the nut and screw is provided primarily by resilient compression of the sealing rib as distinguished from compression of the body of the ring.

In one practice of the invention the elastomeric ring has two continuous circumferential sealing ribs which lie on opposite sides of the means that interlocks the elastomeric ring with the nut. In an alternate practice of the invention two sealing ribs lie on opposite sides of the interlocking means in the immediate vicinity of the interlocking means but the two ribs merge into one central rib that extends over the remainder of the outer circumference of the elastomeric ring.

The features and advantages of the invention may be understood from the following detailed description and the accompanying drawings.

BRIEF DESCRIPTION OF THE DRAWINGS

In the drawings, which are to be regarded as merely illustrative:

FIG. 1 is a sectional view of a selected embodiment of the elastomeric ring;

FIG. 2 is a fragmentary plan view of the ring as seen along the line 2—2 of FIG. 1;

FIG. 3 is a fragmentary sectional view showing the elastomeric ring mounted in a nut of a ball screw actuator;

FIG. 4 is a fragmentary sectional view of a second embodiment of the elastomeric ring;

FIG. 5 is a fragmentary sectional view showing how a key may be employed to interlock an elastomeric ring with the surrounding nut;

FIG. 6 is a fragmentary sectional view illustrating another manner in which an elastomeric ring may be interlocked with a surrounding nut;

FIG. 7 is a fragmentary sectional view as seen along the line 7—7 of FIG. 6;

FIG. 8 is a fragmentary plan view of another embodiment of the elastomeric sealing ring;

FIG. 9 is a transverse sectional view of the sealing ring as seen along the line 9—9 of FIG. 8;

FIG. 10 is a fragmentary sectional view along the line 10—10 of FIG. 8 showing how the elastomeric ring is interlocked with the surrounding nut; and FIG. 11 is a view similar to FIG. 10 showing how a radial pin may be employed to interlock the elastomeric ring with the surrounding nut.

DESCRIPTION OF THE SELECTED EMBODIMENTS OF THE INVENTION

In FIGS. 1–3 illustrating the first embodiment of the invention, a ring, generally designated 20, made of a suitable resiliently deformable elastomer is adapted to be mounted inside a nut 22 of a ball screw actuator to cooperate with a screw 24 of the actuator. For this purpose an inner circumferential channel 25 is formed in the end of the nut 22, the channel having a cylindrical inner circumferential surface.

The resilient ring 20 has a body 26 and is formed with at least one continuous outer circumferential sealing lip or rib in continuous pressure contact with the inner surface of the inner circumferential channel 25. In this particular embodiment of the invention the ring 20 has two outer circumferential sealing ribs 28 adjacent its two opposite side edges respectively. It is to be noted that the width of the body 26 of the ring is appreciably less than the width of the inner channel 25 to give the ring sufficient freedom to shift axially in the inner channel to accommodate variation in the backlash between the nut 22 and the screw 24.

It is contemplated that the resilient ring 20 will be suitably interlocked with the nut 22 to prevent rotation of the ring relative to the nut and various means may be employed for this purpose in various practices of the invention. In this first embodiment of the invention the interlocking relationship is accomplished by providing the resilient ring 20 with a radial projection 30 that extends into a radial bore 32 of the nut 22. It is important to note that the radial bore 32 is sufficiently oversized relative to the radial projection 30 to permit the desired freedom for axial shift of the resilient ring in the inner channel 25. It is also to be noted that the relative dimensions are such that neither of the two sealing ribs 28 reaches the radial bore 32 at either of the two extreme positions of the resilient ring in the inner channel 25. Thus the radial bore 32 serves its purpose without providing a leakage path for lubricant that is confined in the nut.

In the well known manner the nut 22 has an inner thread that cooperates with an outer thread of the screw 24 to form a helical race for antifriction balls of the actuator. Thus the nut 22 is formed with an inner circumferential helical land 34 with the turns of the land separated by a helical groove 35. In like manner the screw 24 is formed with an outer circumferential helical land 36 with the turns of the land separated by a helical groove 38 that cooperates with the helical groove 35 of the nut to form the helical ball race.

The resilient ring 20, in effect, forms a continuation of the inner circumferential surface of the nut 22 and therefore continues the land 34 and the groove 35 of the nut but the unrestrained inside diameter of the resilient ring is less than the inside diameter of the nut as required for sealing contact with the screw 24.

The width of the resilient ring 20 is defined by two parallel planes that are normal to the axis of the ring and this width may vary in various practices of the invention. It is preferred, however, that the width of the resilient ring be approximately the width of one full turn of the external screw thread of the screw 24. Thus in FIG. 1 the width of the resilient ring 20 is the width of one full turn of an inner land 40 and an adjacent inner helical rib 42 of the ring.

In accord with the usual practice the internal dimension of the nut 22 is within a given tolerance and the external dimension of the screw 24 is within a given tolerance and by virtue of these two tolerances there is a given range of clearances between the nuts and the screws when the nuts and screws are mated in the random manner. The underlying concept of the present invention is to have variations in the range of clearance accommodated primarily by the narrow sealing ribs 28 to avoid placing the body 26 of the resilient ring under such high radial compression as to cause the ring to bind on the screw 24 of the actuator. Thus at the maximum clearance between the nut 22 and the screw 24 in the given range of clearances the two sealing ribs 28 are in effective pressure contact with the inner surface of the inner channel 25 and, on the other hand, at the minimum clearance in the range of clearances the sealing ribs 28 are compressed against the body 26 of the resilient ring without overstressing the body of the resilient ring.

In one embodiment of the invention, the radial dimension of the ribs 28 at a point of minimum clearance between the nut 22 and the screw 24 is at least approximately one-half the maximum clearance in the range of clearances. In another embodiment, the radial dimension of the ribs 28 at the point of minimum clearance substantially exceeds one-half the maximum clearance in the range of clearances. These dimensional limitations are preferred to prevent excessive stressing of the body of the ring 20 at the minimum clearance in the range of clearances.

FIG. 4 illustrates a second embodiment of the invention which differs from the first embodiment solely in the manner in which the resilient ring 20a is interlocked with the surrounding nut 22a. The nut 22a has the usual inner circumferential channel 25a and has a radial bore 32a. Instead of being formed with a radial projection, the resilient ring 20a is formed with a radial bore 44 that registers with the radial bore 32a of the nut and a suitable pin 45 seats in the two bores 32a and 44 to interlock the resilient ring with the surrounding nut 22a. Here again, the radial bore 32a of the nut is sufficiently oversized relative to the radial pin 45 to permit the desired freedom for axial shift of the sealing ring in the inner channel 25a. It is apparent that the resilient ring 20a functions in the same manner as the previously described resilient ring 20 with the two outer circumferential sealing ribs 28 of the resilient ring compensating for most if not all of the clearances within the given range of clearances between the nut and the screw.

FIG. 5 shows how the interlocking of a resilient ring 20b with a surrounding nut 22b may be accomplished by means of a key 46 that seats both in an inner keyway 48 of the nut and a cooperating outer keyway 50 of the resilient ring. It can be seen that the key 46 is shorter than the outer keyway 48 to give the resilient ring 20b the desired freedom for axial shift in the inner channel 25b of the nut 22b.

It is apparent in FIG. 5 that the employment of the key 46 for interlocking the resilient ring with the nut destroys the sealing effectiveness of the outermost of the two outer circumferential sealing ribs 28b of the resilient ring but the innermost sealing rib is left intact to function as an effective seal. Although the outermost sealing rib does not function as an effective seal, nevertheless it has utility in cooperating with the innermost sealing rib for balanced pressure contact with the inner surface of the channel 25b.

The embodiment shown in FIGS. 6 and 7 is largely similar to the embodiment shown in FIG. 5 as indicated by the use of corresponding numerals to indicate corresponding parts. One difference is that the nut 22c is not formed with an inner keyway and the other difference is that a short key 52 equipped with a radial pin 54 is substituted for the key 46 in FIG. 7. The key 52 slidingly seats in an outer keyway 55 of the ring 20c and the small radial pin fits snugly into a corresponding radial bore 56 of the nut 22c. Since the key 52 is substantially shorter than the keyway 55 of the ring 20c, the ring has ample freedom to shift axially to accommodate backlash between the screw and the nut.

In the embodiment of the invention shown in FIGS. 8–10, the sealing ring 20d is seated in an inner channel 25d of a nut 22d and is formed with a radial projection 58 which extends into an oversized radial bore 60 of the nut. The resilient ring 20d has a single central outer circumferential sealing rib 62 that extends around all of its circumference except in the region of the radial projection 58 where the single sealing ring 62 is continued as a circular sealing rib 64 that surrounds the radial projection 58. The diameter of the circular sealing rib 64 is sufficiently larger than the radial bore 60 of the nut 22d to keep the circular sealing rib away from the radial bore at the extreme positions of the resilient ring 20d relative to the channel 25d to make sure that sealing effectiveness is maintained.

The embodiment of the invention shown in FIG. 11 is largely identical to the embodiment shown in FIGS. 8-10 as indicated by the use of corresponding numerals to indicate corresponding parts. The sole difference is that the sealing ring 20e in FIG. 11 is interlocked with the nut 22e by a pin 65, the pin 65 slidingly seated in the radial bore 60 of the nut 22e and snugly fitted into a radial bore 66 of the resilient ring.

My description in specific detail will suggest various changes, substitutions and other departures from my disclosure within the spirit and scope of the appended claims.

I claim:

1. In a ball screw actuator having a screw embraced by a nut with given dimensional tolerances of the nut and screw providing a given range of clearances between the nut and the screw, wherein the screw has an outer circumferential helical groove cooperating with an inner circumferential helical groove of the nut to form a ball race, the improvement to seal off the ball race from one end of the nut and to keep lubricant in the ball race and to prevent foreign material from entering the ball race, comprising:

the nut being formed with a continuous inner circumferential channel;

a resiliently deformable elastomer ring seated in the channel; and cooperative means on the nut and the ring respectively interlocking the nut and the ring to prevent rotation of the ring relative to the nut, said ring having a body with an outer circumferential surface and at least two side surfaces defining the width of the ring, and having at least one continuous sealing rib disposed on the outer circumferential surface of the body and of substantially less width than the width of the body for continuous sealing contact with the bottom wall of the channel, the radial dimension of the ring including the sealing rib relative to the radial dimension of the channel being of a magnitude for the ring to form an effective seal between the nut and the screw without binding compression of the body of the ring at the minimum clearance in said range of clearances, the radial dimension of the rib being of a magnitude for the ring to form an effective seal between the nut and screw at maximum clearance within said range, whereby compensation for the range of clearances between the nut and the screw is provided primarily by resilient compression of the sealing rib as distinguished from compression of the body of the ring.

2. An improvement as set forth in claim 1 in which the radial dimension of the rib at a point of minimum clearance in the range of clearances is at least approximately one-half of the maximum clearance in said range of clearances to prevent excessive stressing of the body of the ring at the minimum clearance in the range of clearances.

3. An improvement as set forth in claim 1 in which the radial dimension of the sealing rib substantially exceeds one-half of the maximum clearance in said range of clearances to prevent excessive stressing of the body of the ring at the minimum clearance in the range of clearances.

4. An improvement as set forth in claim 1 in which the inner circumference of the ring embraces at least one full turn of the helical groove of the screw.

5. An improvement as set forth in claim 1 in which the channel is wider than the ring to provide the ring with freedom of axial movement within at least a portion of the channel, and in which the interlocking means permits said freedom of axial movement to accommodate backlash between the screw and the nut.

6. An improvement as set forth in claim 1 in which the ring is made of polyethylene.

7. An improvement as set forth in claim 1 in which the ring has a first continuous outer circumferential sealing rib adjacent one of the side edges of the ring and cooperating with the channel to maintain the lubricant upon the helical groove of the nut, and a second continuous outer circumferential sealing ring adjacent the other of the side edges of the ring and cooperating with the channel to seal foreign matter exterior of the nut from the lubricant.

8. An improvement as set forth in claim 1 in which the ring has a single outer circumferential sealing rib centrally disposed upon the circumference of the ring except in the region of the interlocking means, the surrounding sealing rib being continuous with the single sealing rib.

9. An improvement as set forth in claim 1 in which the cooperating interlocking means comprises a recess in one of said nut and said ring and means projecting into the recess from the other of said nut and said ring, said projecting means being of less cross section than the recess to permit the ring to shift axially in the channel.

10. An improvement as set forth in claim 9 in which the recess is in the nut and the projecting means is integral with the ring.

11. An improvement as set forth in claim 9 in which the recess is in the ring.

12. An improvement as set forth in claim 1 in which the nut has a radial bore in the region of the channel and means projects from the ring into the bore to interlock the ring with the nut, the bore being oversized relative to the projecting means to permit the ring to shift axially in the channel.

13. An improvement as set forth in claim 12 in which said projecting means is integral with the ring.

14. An improvement as set forth in claim 12 in which the ring has a radial bore registered with the radial bore of the nut, and the projecting means comprises a pin which extends through the two bores to interlock the ring with the nut.

15. An improvement as set forth in claim 1 in which one of said nut and said ring has a keyway substantially parallel with its axis and key anchored to the other of said nut and said ring slidingly engages said keyway to prevent rotation of the ring relative to the nut, the key being shorter than the keyway to permit the ring to shift axially within the channel.

16. An improvement as set forth in claim 15 in which the keyway is in the outer circumference of the ring and the key is anchored to the nut.

17. In a ball screw actuator comprising a screw having an outer circumferential helical groove embraced by a nut having a helical groove on the inner circumferential surface, a seal for wiping the helical groove of the screw and sealing a lubricant within the actuator, comprising:

a resiliently deformable ring having an inner surface for wiping the helical groove of the screw and an outer circumferential surface for slidingly engaging at least a portion of the inner circumferential surface of the nut;

first means extending from the circumferential surface of the nut and disposed relative to the ring and the nut and having a configuration relative to the nut for resisting the rotation of the ring relative to the nut while permitting the axial movement of the ring relative to the nut along at least a portion of the inner circumferential surface of the nut; and second means extending from the circumferential surface of the ring and having a configuration relative to the nut to provide a seal between the ring and the nut, the second means having properties for absorbing substantially all of the overstressing of the ring relative to the nut when the clearance between the screw and the nut is reduced whereby the configuration of the ring is substantially maintained.

18. A seal as set forth in claim 17 wherein the first means includes a recess in one of said nut and said ring and means projecting into the recess from the other of said nut and said ring, said projecting means being of less axial cross section than the recess to permit the ring to shift axially on at least a portion of the inner circumferential surface of the nut.

19. A seal as recited in claim 18 wherein the recess is in the nut and the projecting means is integral with the ring.

20. A seal as defined in claim 18 in which the recess is in the ring.

21. A seal as defined in claim 17 wherein the second means comprises:
at least one continuous annular lip integral with the ring for displacing the outer circumferential surface of the ring from the inner circumferential surface of the nut, wherein an outward radial force on the ring tends to flatten the lip to decrease the distance between the ring and the inner circumferential surface of the nut so that the confirmation of the ring is substantially maintained.

22. The seal as set forth in claim 17 wherein the ring has a body portion defined by:
a pair of axially displaced side surfaces and the inner and outer circumferential surfaces and; wherein
the continuous annular lip is disposed on the outer circumferential surface of the ring to space the ring from the inner circumferential surface of the nut.

23. The seal as recited in claim 22 wherein the annular lip has an axial width substantially less than the axial width of the ring between the pair of side surfaces so that a radial force on the ring creates a greater pressure on the annular lip than on the body portions of the ring whereby the annular lip is substantially deformed and the confirmation of the body portion is substantially maintained.

* * * * *